Nov. 25, 1969  J. E. WARD, JR  3,480,098
HYDRAULIC LEVELLING AND CONTROL MEANS FOR
TRACTORS AND OTHER VEHICLES
Filed March 1, 1968  3 Sheets-Sheet 1

INVENTOR.
JESSE E. WARD, JR.
BY Kimmel, Crowell & Weaver
ATTORNEYS.

Nov. 25, 1969  J. E. WARD, JR  3,480,098
HYDRAULIC LEVELLING AND CONTROL MEANS FOR
TRACTORS AND OTHER VEHICLES
Filed March 1, 1968  3 Sheets-Sheet 2

INVENTOR.
JESSE E. WARD, JR.
BY
Kimmel, Crowell & Weaver
ATTORNEYS.

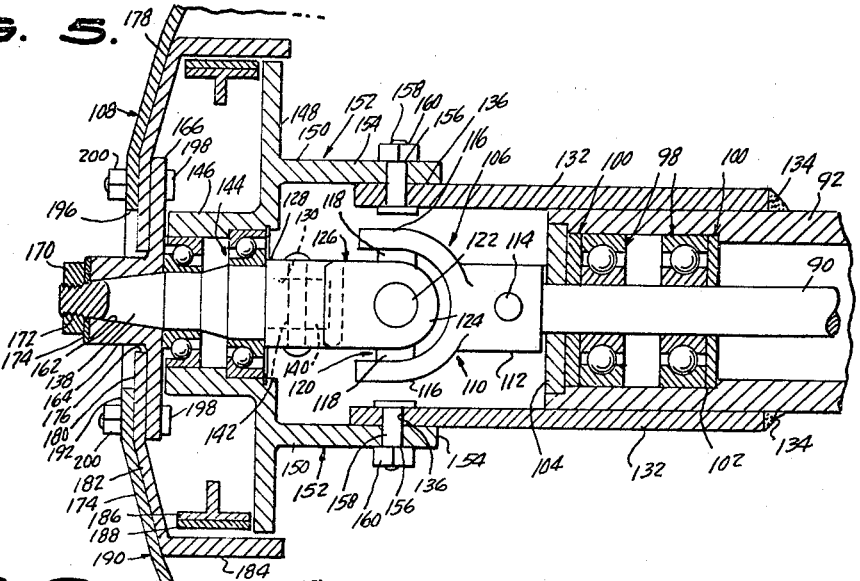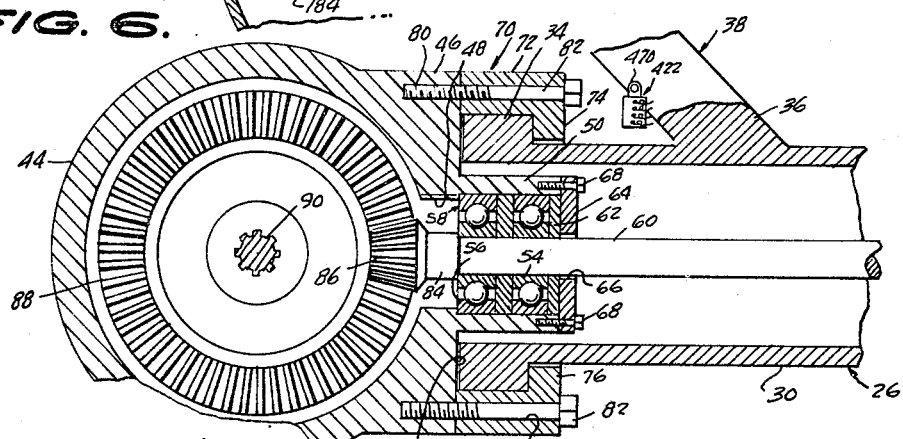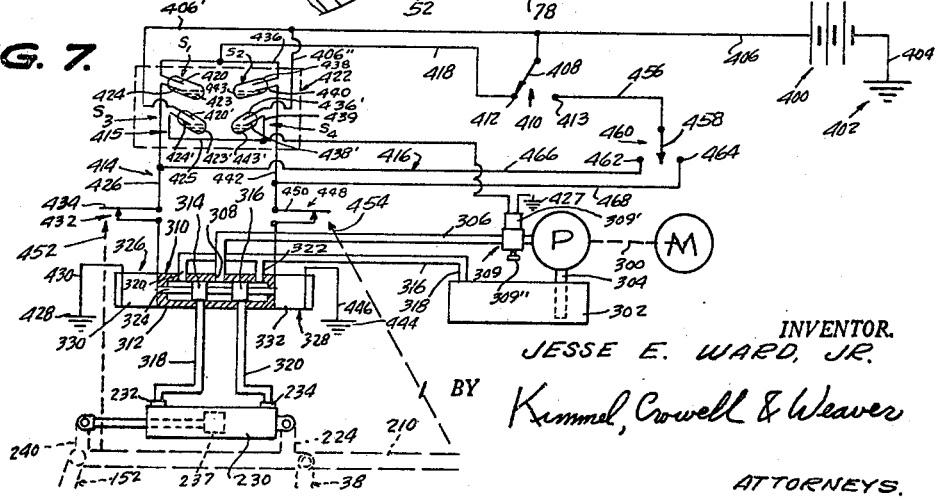

United States Patent Office 3,480,098
Patented Nov. 25, 1969

3,480,098
HYDRAULIC LEVELLING AND CONTROL MEANS FOR TRACTORS AND OTHER VEHICLES
Jesse E. Ward, Jr., 3210 5th Ave.,
Phenix City, Ala. 36867
Filed Mar. 1, 1968, Ser. No. 709,665
Int. Cl. B60g *19/00, 17/00;* B60k *17/00*
U.S. Cl. 180—41                  6 Claims

ABSTRACT OF THE DISCLOSURE

An automatically actuated control system for vehicles which are adapted to operate on terrain including ground surfaces at angles of inclination other than horizontal, the apparatus of the invention comprising a straight line drive shaft between the differential and transmission; the differential including a housing therefor from the opposite sides of which laterally project axle housings carrying driven rear axles; the housings being freely swingable about the axis of the drive shaft; universal connecting means between the rear axles and the rear wheels of the vehicles; and means responsive to a tilting movement of the chassis to return the vehicle chassis, its wheels, and the vehicle operator to their normal upright position relative to a horizontal ground plane while maintaining the center of gravity passing through the center of the vehicle perpendicular to a horizontal plane at all times.

BACKGROUND OF THE INVENTION

This invention relates to levelling means for automotive vehicles and, more specifically, to any type of prime movers such as, for example, tractors of both high and low power ratings. The levelling means includes a system which becomes operative when the vehicle is worked on terrain such as hillsides, inclined road shoulders and ditches, and finds suitable application with tractors powered for towing single or gang connected grass mowers or on higher powered vehicles used in farm husbandry.

While tractor levelling systems are not, per se, new in the art, most of the prior art devices require special suspension systems, involve sluggish actuators, necessitate complex mechanical and hydraulic control means, are expensive to manufacture and maintain, and by virtue of their construction such devices or systems are inherently dangerous and are frequently the cause of physical injury to the operator of the vehicle.

It is, therefore, one of the primary objects of this invention to provide in a tractor type vehicle, power operated automatically actuated means to effect the self-levelling of the tractor about its longitudinal axis when operating on terrain inclined at an angle other than a straight angle relative to a normally horizontal ground plane.

Another object of this invention is to provide automatically operated means to effect the self-levelling of a tractor type vehicle when a rear wheel drops suddenly into a deep cavity or hole, the self-levelling means under these circumstances including fast actuating safety means.

A further object of this invention is to provide a low cost tractor with automatically operated levelling means which involves but a minimum of mechanical elements that may be actuated via a non-complex electro-hydraulic control system.

Still another object of this invention is to provide a tractor type vehicle of the kind generally described above and which is, in the overall picture, non-complex in assembly and construction, inexpensive to manufacture, and which is rugged and durable in use.

Other and further objects and advantages of the instant invention will become more manifest from the consideration of the following specification when read in conjunction with the drawings annexed hereto.

SPECIFICATION

FIGURE 5 is an enlarged fragmentary detailed cross-sectional view, FIGURE 5 being taken substantially on the horizontal plane of line 5—5 of FIGURE 3, looking in the direction of the arrows;

FIGURE 6 is an enlarged fragmentary detailed cross-sectional view, FIGURE 6 being taken substantially on the vertical plane of line 6—6 of FIGURE 1, looking in the direction of the arrows; and FIGURE 7 is a schematic illustration of the hydro-electrical control system according to this invention.

Figures 1, 2:
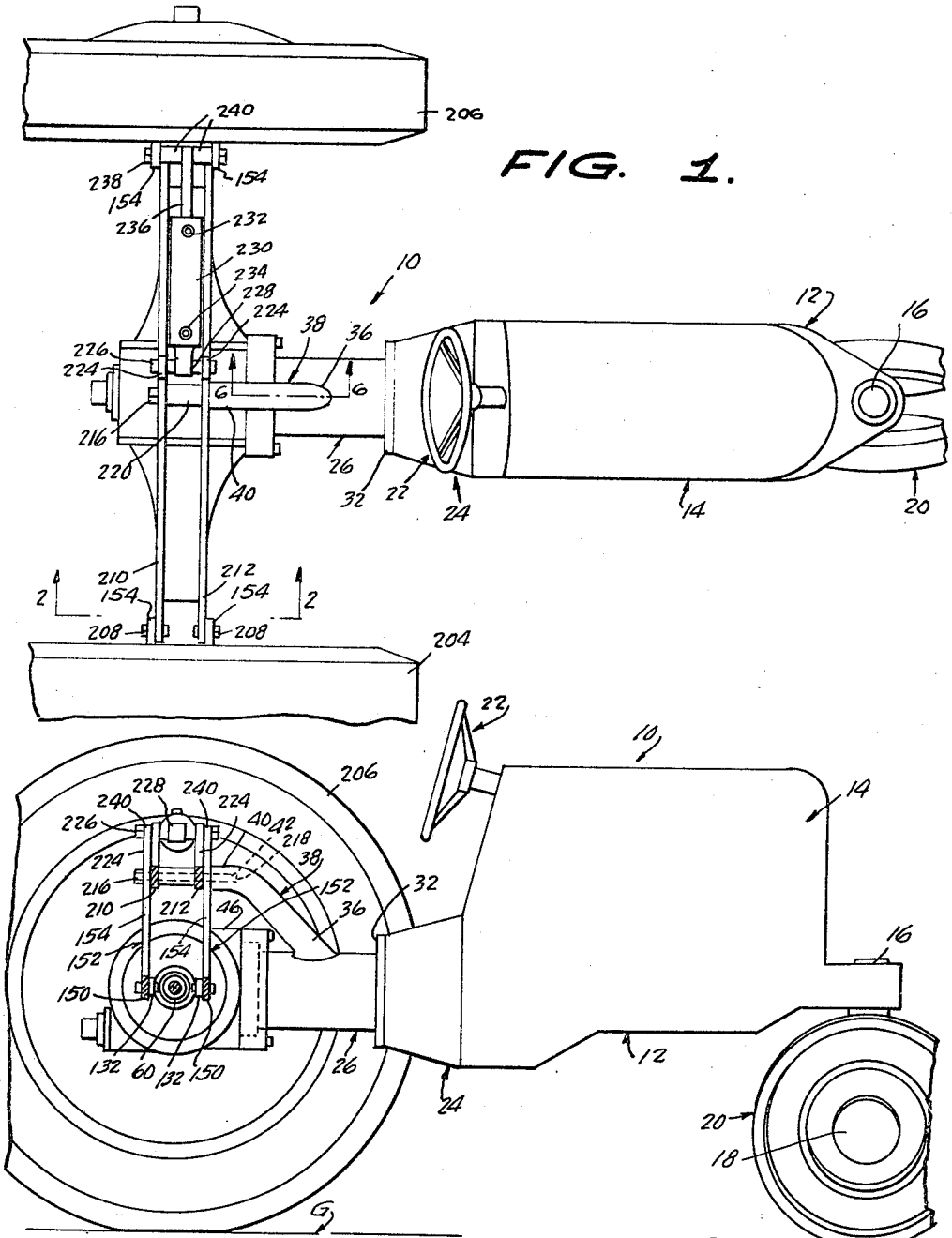
FIGURE 1 is a top plan view of a tractor with self-levelling means of this invention connected thereon.
FIGURE 2 is a side elevational view, partly in cross-section, FIGURE 2 being taken substantially on the vertical plane of line 2—2 of FIGURE 1, looking in the direction of the arrows.

Referring now more specifically to the drawings, reference numeral 10 designates, in general, a tractor type vehicle constructed in accordance with the teachings of this invention. The tractor 10 comprises a suitable elongated chassis 12 supporting a conventional motor (not shown) enclosed under a motor hood or shield 14. The forward end of the chassis 12 rotatably supports a normally upright front steering shaft 16 which, at its lower end, is connected to conventional axle means 18 on the outer ends of which are rotatably connected a single pair of front wheels 20. Steering of the vehicle 10 is manually achieved by the steering wheel 22 which is connected to front wheels 20 by suitable means (not shown) well known in the art. The tractor 10 is also shown as being provided with the conventional transmission housing 24 which constitutes a fixed or integral part of the chassis 12. The above referred to tractor components are but briefly described since all comprise elements and combinations thereof known to those skilled in this art. Also, and to prevent clouding of the specification and the drawings, the operator's seat and other miscellaneous equipment normally connected directly or indirectly to the chassis 12 have been omitted as being unessential to and understanding of this invention.

At 26 is denoted an elongated substantially hollow drive shaft casing having a sidewall 30 which terminates at its forward end in an enlarged outwardly projecting cylindrical mounting flange 32 that is rigidly connected to the rear face or end of the transmission housing 24 by any conventional means (not shown) and this thus becomes a fixed portion of the chassis 12. The other end of the sidewall 30 also terminates in a similar enlarged outwardly projecting cylindrical flange which bears the reference numeral 34.

Projecting upwardly and rearwardly from the sidewall 30 at the normally upper side thereof, and having a front end 36 integrally or fixedly connected thereon, is an elongated substantially solid cylindrical standard 38 which terminates in a rearwardly projecting cylindrical arm 40 that extends in vertically spaced relation above and beyond the adjacent rear flange 34 of the sidewall 30. The arm 40 is formed with an internally tapped bolt hole 42 to serve a purpose to be described. Since the standard 38 is rigidly connected on the sidewall 30 which, in turn, is fixedly connected to the transmission housing 24 forming a component of the chassis 12, the arm 40 also becomes a fixed element of the chassis.

Reference numeral 44 generally indicates an annular differential housing having opposed open sides. The housing 44 includes a forwardly extending cylindrical boss 46 which is centrally bored to form a drive shaft receiving passageway 48. The boss 46 is reduced in diameter to form a forwardly extending hollow cylindrical elongated neck 50 open at its opposed ends and which inherently provides, at its inner end, an adjacent abutment shoulder 52. The neck 50 includes a passage 54 which comprises a counterbore of the passageway 48 and provides an inner shoulder 56 against which seats one end of a conventional series of bearing rings 58 disposed in and substantially occupying the passage 54. As is seen in FIGURE 6, the rear end of the tractor drive shaft 60 is supported and journaled for rotation in the bearing rings 58, and the latter are held against axial movement in a forward direction by a thrust and sealing washer 62 mounted on the drive shaft 60 and a substantially cylindrical retainer plate 64 which is superimposed thereover and is centrally apertured at 66 to receive the drive shaft 60 therethrough. Any conventional securing means, such as the bolts 68, may be employed to releasably connect the retainer plate 64 on the adjacent end of the neck 50.

As is seen in FIGURE 6, the neck 50 is introduced into the open rear end of the sidewall 30 until the shoulder 52 of the boss 46 is approximate to but spaced a small distance from the adjacent end of the flange 34. The boss 46 and, consequently, the differential housing 44 are then connected to the flange 34 and, consequently, to its integrally connected sidewall 30 of the drive shaft casing 26, this being accomplished by split clamp means 70.

The clamp means 70 includes a substantially hollow cylindrical collar 72 having an end wall 74 extending across one end thereof and which is centrally apertured as at 76. As is seen in FIGURE 6, the rear end portion of the sidewall 30 adjacent the inner end of the flange 34 is received within the aperture 76, and the collar 72 is mounted on the flange 34 with the confronting ends of the flanges 34, 74 abutting one another. The outside diameter of the sidewall 30 received within the aperture 76 and the inside diameter of the collar 72 and the outside diameter of the flange 34 are such as to permit a snug, but not a tight fit, between the clamp means 70 and the adjacent end of the drive shaft casing 26 whereby the same are freely rotatable relative to one another about a common axis.

The collar 72 is provided with a plurality of circumferentially spaced bolt holes 78 and the adjacent end of the boss 46 is provided with correspondingly circumferentially spaced tapped openings 80, the holes 78 and openings 80 receiving bolts 82 therethrough to connect the differential housing 44 on the drive shaft housing 26 for rotation about the axis of the latter. Again referring to FIGURE 6, it will be seen that the axial length of the collar 72 is such that as the bolts 82 are taken up, the shoulder 52 abuts the adjacent end of the collar but is held spaced a slight distance from the adjacent end of the flange 34 to eliminate friction therebetween.

The rear end of the drive shaft 60 is fixedly connected in the hub 84 of a bevel gear 86. The hub 84 is normally disposed in the passageway 48 in concentrically spaced relation relative thereto, and the bevel gear 86 extends into the differential housing 44 to mesh with one ring gear 88 of a differential gearing system of any conventional design. The ring gear 88 is shown as being disposed adjacent one side of the housing 44 and is fixedly connected in a conventional manner on the inner end of one rear axle 90. The opposed second axle (not shown) is conventionally driven by the differential gearing system in the usual manner.

Each shaft 90 is enclosed in an elongated hollow tubular axle housing 92 having an enlarged inner bell-shaped end 94 terminating in a flange 96 fixedly connected by conventional means (not shown) to the opposed open sides of the differential housing 44.

The outer end of the housings 92 carry conventional bearing inserts and spacers generally denoted at 98 and held against axial displacement by an internal shoulder 102 and an outer keeper plate 104 fixedly connected adjacent the outer terminal end of its associated housing. The outer end of each axle 90 is journaled for rotation in the adjacent bearings, spacers and keeper plate 98, 100, 104, respectively, and their respective outer terminal ends project beyond the proximate one of the keeper plates 104. To each outer terminal end of the axles 90 is connected a conventional universal joint generally designated by the reference numeral 106 which, in turn, connects one of the rear wheels 108 in driven relationship with its adjacent rear axle 90.

The universal joint 106 includes a first clevis element 110 having a shank 112 connected on the adjacent terminal end of the shaft 90 as by the transverse pin 114, and laterally spaced arms 116. Pivotally connected on and extending between the arms 116 is a substantially cylindrical stem 118 of a cruciform connector pin 120. The pin 120 includes a centrally located substantially cylindrical cross-arm 122 that extends between and pivotally connects a second pair of laterally spaced arms 124 (only one being shown) of a second clevis element 126 having a shank 128 formed with an axial socket 130. Further reference to the universal joint 106 will be made below.

Figure 3:
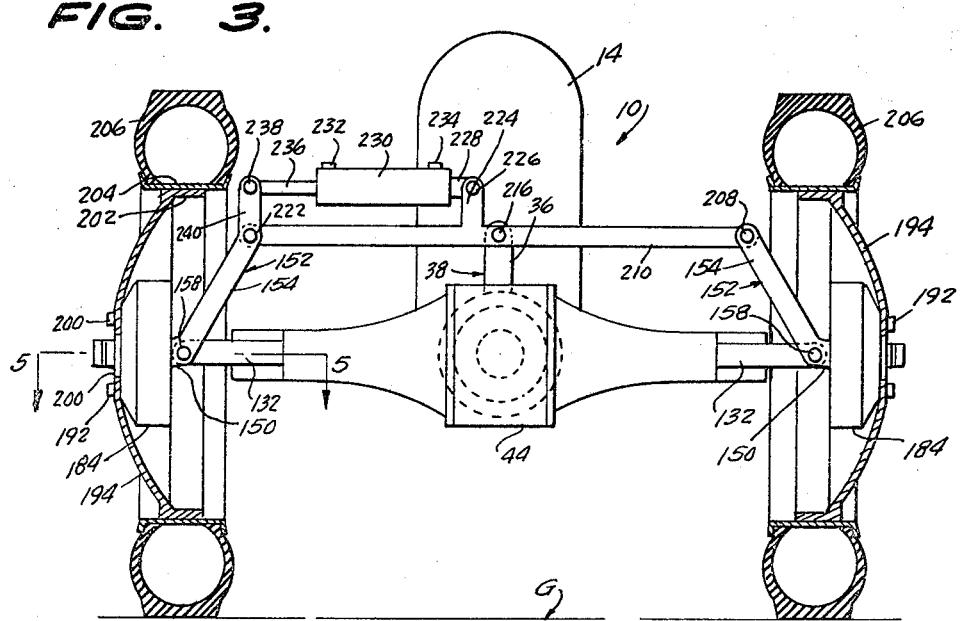
FIGURE 3 is a rear end view of the tractor and self-levelling means, this figure being partly in cross-section and showing the component elements of this invention in their normal operating positions with the tractor traversing a substantially horizontal ground plane.

Referring now to FIGURES 1, 3 and 5, reference numerals 132 each designate an elongated identically constructed substantially rectangular strap formed of any suitable rigid material. As is seen in these figures, these straps 132 are arranged in pairs with each pair being fixedly connected, as by welding 134 to the outer ends of each axle housing 92 at diametrically opposed sides thereof. Each pair of straps 132 projects longitudinally beyond the adjacent end of its axial housing 92 a distance substantially equal to the longitudinal length of the clevis element 126. The outer ends of the pairs of straps 132 are provided with coaxially aligned openings 136 and their respective coincident axes are contained in a plane which always includes the longitudinal axis of the stem 118.

Reference numeral 138 denotes one of a pair of conventional rear stub axles of conventional construction. Each stub axle 138 is provided at one of its respective ends with an axially extending cylindrical boss 140 of reduced diameter and which is received in one of the sockets 130 formed in the shank 128 of the second clevis element 126 and is fixedly connected therein by conventional means, the rivet or headed cross pin 142, for example. The other end of the stub axle 138 is journaled for rotation in conventional bearings 144 disposed and suitably retained in a bearing housing 146.

The housing 146 is integral with and is substantially centrally located relative to a substantially flat cylindrical back plate 148 of the vehicle wheel 108. Integrally or otherwise fixedly connected to the outer side of each back plate 148 and projecting laterally therefrom on diametrically opposed sides thereof is one end of a pair of laterally spaced and substantially parallel first arms 150 of pair of bell crank levers 152, respectively, each lever 152 also including a normally upright second arm 154. Each pair of adjacent levers 152, at their apicies, is transversely bored to form a pair of coaxially aligned openings 156. The spacing between the bell crank levers 152 is such as to permit them to snugly receive the adjacent pair of straps 132 therebetween in superimposed relation relative thereto. The adpacent pairs of openings 136, 158 are aligned to receive pivotal fastening means such as, for example, the pivot bolts 158 which are held against displacement by retainer nuts 160.

The outer end of each stub axle 138 is tapered (see FIGURE 5) to be frictionally received within a complementary socket 162 of a wheel hub 164 integral at one end with a substantially flat hub plate 166. The outer terminal end of each stub axle 138 is threaded at 170 to receive the lock nut 172 and washer 174 thereover in the conventional manner.

The outer end of each stub axle 138 projects through an opening 176 centrally positioned in a brake housing 178 with the cylindrical flat central section 180 juxtaposed against the outer side of the hub plate 166. The central section 180 is integral at its periphery with the frustrum end of a frusto-conical sidewall 182, and the latter at its base end continues into a substantially hollow cylindrical brake drum 184 coaxially related to the axis of the stub axle 138 and concentrically spaced from the bearing housing 146. Disposed within the brake housing 178 are conventional brake shoes 186 haxing externally mounted brake liners 188 secured thereon and confronting adjacent inner portions of the drum 184. Conventional operating means (not shown) for the brake shoes 186 is provided.

Each wheel 108 also includes, in the usual manner, a front face plate 190 having a central flat cylindrical portion 192 superimposed against the outer side of the adjacent central section 180, and a concave-convex main body portion 194 (see FIGURE 3). The cylindrical portion 192 is located at the apex end of the concave-convex main body portion 194 and is centrally apertured as at 196 to receive the hub 164 therethrough. The superimposed and juxtaposed hub plate 166, central section 180 and central portion 192 are connected together as by bolts 198 and nuts 200.

Each main body portion 194 opens inwardly in confronting relationship relative to one another and at their respective curvilinear base end, each terminates in an integrally formed hollow cylindrical flange 202 coaxial with respect to the central normally horizontal axis of the main body portion 194. To each flange 202 is fixedly connected a hollow conventional wheel rim 204 which mounts the usual tire 206.

The arms 154 of each pair of bell crank levers 152 at opposed sides of the vehicle or tractor 10 converge upwardly towards one another (see FIGURE 3) as the vehicle rests on or traverses horizontal terrain. The rearmost and forward ones of the arms 154 at one side of the tractor 10 and at their respective upper ends, are pivotally connected onto the pins 208 to the adpacent ends of a pair of transversely extending laterally spaced and substantially parallel leongated rectangular rear and front levers or tie bars 210, 212, respectively. The tie rods 210, 212 intermediate their respective ends are pivotally supported for rotation about the transversely extending bolt type pivot pin 216 having its threaded end 218 threadedly received within the bolt hole 42 of the arm 40. A spacer collar 220 is normally mounted on the bolt 216 to extend between adjacent confronting sides of the levers or tie bars 210, 212. The other ends of the tie bars 210, 212 are pivotally connected with the upper ends of the other pair of arms 154 at the other side of the tractor 10 as by a common pivot pin 222 (see FIGURES 3 and 4) on which is preferably mounted a conventional spacer collar (not shown).

Disposed adjacent to but spaced off center in the direction of the pivot pin 222 and projecting upwardly from each tie bar 210, 212 is a pair of hanger brackets 224, 224 which support the opposed ends of a cross-pivot pin 226. The pivot pin 226 pivotally connects thereon the lug end 228 of a conventional hydraulic cylinder 230 ported at 232, 234. The hydraulic cylinder 230 is provided with the usual reciprocal piston rod 236 and piston 237 (see FIGURE 7). A cross-pivot pin 238 is connected, intermediate its ends, to the outer end of the piston rod 236 and pivotally connects the free ends of off-set normally upright extensions 238, 240 of the arms 154 of the adpacent pair of bell-crank levers 152.

The hydro-electric control system of this invention is schematically illustrated in FIGURE 7 and includes motor means M which may comprise the motor of the tractor or an independent motor, if desired, mounted at any suitable location on the chassis 12. In a conventional manner the motor M is drivingly connected at 300 with a conventional fluid pump P which at its low pressure side is in open communication with a fluid reservoir 302 via a conduit 304. The high pressure side of the pump P connects by a conduit 306 with an inlet port 308, via an electro-magnetically operated adjustable fluid volume control or regulator valve 309 of conventional construction including a winding 309' and preset handle control means 309", of an elongated cylindrical and conventional spool valve having a casing 312. The regulator valve 309 is constantly open and in its normal setting permits a constant volume of hydraulic liquid to flow therethrough per given unit of time while the winding 309' is deenergized. This volume is less than the full capacity of the pump P which will deliver substantially its maximum volume to the inlet port 308 upon energization of the winding 309' which, in turn, substantially fully opens the valve 309.

The hydraulic side of the system further includes a fluid return conduit or header 316 having a first branch conduit 318 in open communication with the reservoir 302, and second and third branch conduits 320, 322 which open into the casing 312 adpacent each end thereof at the remotely disposed ends of a pair of valve spools 314, 316. The valve spools 314, 316 are here shown as being mounted on a reciprocable armature 324 extending axially of the casing 312 and being common to a pair of electromagnets 326, 328 having windings 330, 332, respectively. The armature 324 and its associated valve spools 314, 316 are conventionally spring biased to the neutral positions thereof shown in FIGURE 7, all in the usual manner. The windings 330, 332 are mounted on the opposed ends of the casing 312, as shown.

The valve spools 314, 316 are shown in FIGURE 7 in their normal neutral or closed positions in which they close appropriate ports to which one of the ends of a pair of conduits 318, 320, respectively, are connected. The other ends of the conduits 318, 320 are connected, respectively, to one of the ports 232, 234 at, respectively, the opposed ends of the hydraulic cylinder 230.

All of the above described component elements of the hydraulic system may be mounted and carried on the chassis 12 wherever desired and in suitable locations which are optional with the user, and hence are not positively shown in the FIGURES 1 to 6, inclusive, with the exception of the hydraulic cylinder 230 and the elements associated and connected therewith to effect the necessary mechanical operation of the equipment.

The electrical components comprise the tractor generator or battery 400 having a side grounded at 402 through wire 404. The other side of the battery connects through wire 406 with the manually operated switch arm 408 of a single pole double through switch 410 having a pair of fixed switch contacts 412, 413. The switch contact 412 is included in a pair of automatically controlled electrical circuits 414, 415, and the fixed switch contact 413 is connected in a manually operable overriding electrical circuit 416.

The automatically operated circuit 414 includes a wire 418 connected at one end to the fixed switch contact 412 which is normally closed by the switch arm 408, as shown, and its other end connects to one switch point 420 of a pair of adjacent switch points of the normally open mercury switch $S_1$ having a pool of mercury 423 therein. The other switch point of the switch $S_1$ connects via wire 426 to one side of the winding 330 of the electromagnet 326, and the other side of the winding 330 grounds at 428 through wire 430. The wire 426 is interrupted by a normally closed micro-switch or other suitable switch means 432 having a switch arm 434.

A lead 436 has one of its ends connected to the wire 418 and its other end to the switch point 438 of a mercury switch $S_2$, and the other adjacent switch point 440 of this switch connects via the wire 442 with one side of the coil 332 of the electromagnet 328. These switch points are normally open but may be closed by a mercury pool 443. The other side of the coil 332 grounds at 444 through wire 446. As is seen in FIGURE 7, the wire 442 is interrupted by a normally closed micro or other suitable switch means 448 having a switch arm 450.

At 452, 454 is indicated a pair of conventional switch actuator arms each having respectively, one of their ends fixedly connected to one of the tie bars 210, 212 at opposite sides of the pivot pin or bolt 216. The other ends of the actuators 452, 454 are disposed adjacent to but spaced from the switch arms 434, 450 to serve a purpose to be described, infra. This completes the description of the first of the automatically controlled circuits, circuit 414.

The second of the automatically controlled circuits, circuit 415, involves the switch $S_3$ as a component element thereof. As is seen in FIGURE 7, a lead 406' connects the switch point 420' of the switch $S_3$ with the wire 406. The switch point 420' is in juxtaposed spaced relation, relative to the switch point 424', and these last mentioned switch points are opened and closed by a mercury pool 423', but the switch $S_3$ is normally open. The second automatically controlled circuit 415 also includes the juxtaposed and laterally spaced switch points 436', 438' of the mercury switch $S_4$, these switch points being normally open but which may be closed by the mercury pool 443'. As is seen in FIGURE 7, the switch point 424' connects by wire 425 to one side of the winding 309' of the regulator valve 309, the other side of the winding 309' being grounded as at 427. The switch point 438' is connected in the same circuit to the winding 309' by means of the wire 439 and its connection with the wire 425.

At 452, 454 is indicated a pair of conventional switch actuator arms each having, respectively, one of their ends fixedly connected to one of the tie bars 210, 212 at opposite sides of the pivot point or bolt 216. The other ends of the actuators 452, 454 are disposed adjacent to but spaced from the switch arms 434, 450 to serve a purpose to be described, infra. The overriding electrical circuit 416 includes a wire connection 456 between the fixed switch contact 413 and the switch arm 458 of a normally open single pole double throw switch 460 having fixed switch contacts 462, 464, the switch arm 458 being normally spring biased to its open position by conventional means (not shown). Wire 466 connects contact 462 with the wire 426, and a wire 468 connects contact 464 with the wire 442.

The components of the hydro-electrical system described above, with but the exception of the hydraulic cylinder 230 and the mercury switch 422, may be located as desired on the chassis 12. The position and mounting of the hydraulic cylinder 230 has been specifically described and illustrated and the mercury switch 422 is here shown as being fixedly connected to the standard 38 as by bracket means 470. The positioning of this switch is critical to the extent that the mercury switch 422 should be located as near as possible to the longitudinal axis of the shaft 60. While the mercury switch 422 has been described as being of conventional construction and no patentable novelty is asserted thereto herein, per se, however, and since it does form an important component of the present invention, a brief description thereof follows.

The switch 422 shown in FIGURES 6 and 7 includes a casing in which is set the mercury switches $S_1$, $S_2$, $S_3$ and $S_4$. The switch 422 is, as stated above, compound in that it does comprise two double pole double throw switches which are identified by the identifying indicia $S_1$, $S_2$ and $S_3$, $S_4$, respectively. Of these double pole double throw switches the first comprising the switches $S_1$, $S_2$ is vertically spaced above the second double pole double throw switch involving the switches $S_3$, $S_4$. Further, the switches $S_1$, $S_3$ at the left side of the mercury switch 422 as shown in FIGURE 7, and the switches $S_2$, $S_4$ at the right hand side thereof are preferably spaced equidistant from a vertical medial plane which bisects the axis of the chassis 12 longitudinally. By conventional adjusting means, not shown, the switches $S_1$, $S_2$ are set to close when the attitude of the vertical plane last mentioned swings in either direction through a predetermined arcuate distance relative to a horizontal plane, 3° for example. In a like manner, the switches $S_3$, $S_4$ are preset and adjusted to close only when the attitude of the last mentioned plane reaches a second angle in either direction of, for example, 10°. Thus, and having described the component elements of this invention in detail and having illustrated the same in the annexed sheets of drawings, a brief description of the operation of this invention follows:

Under normal operating conditions, the aforementioned vertical plane longitudinally bisects the tractor 10 and is perpendicular to the horizontal plane of the ground line G. If it be assumed that the tractor 10 is being operated over such terrain with the motor M being actuated to drive the pump P and the switch arm 408 is in engagement with the switch contact 412 of the automatic control circuit, the other components of the vehicle or tractor 10 will be in their respective positions shown in all of the figures with the exception of FIGURE 4.

Figure 4:
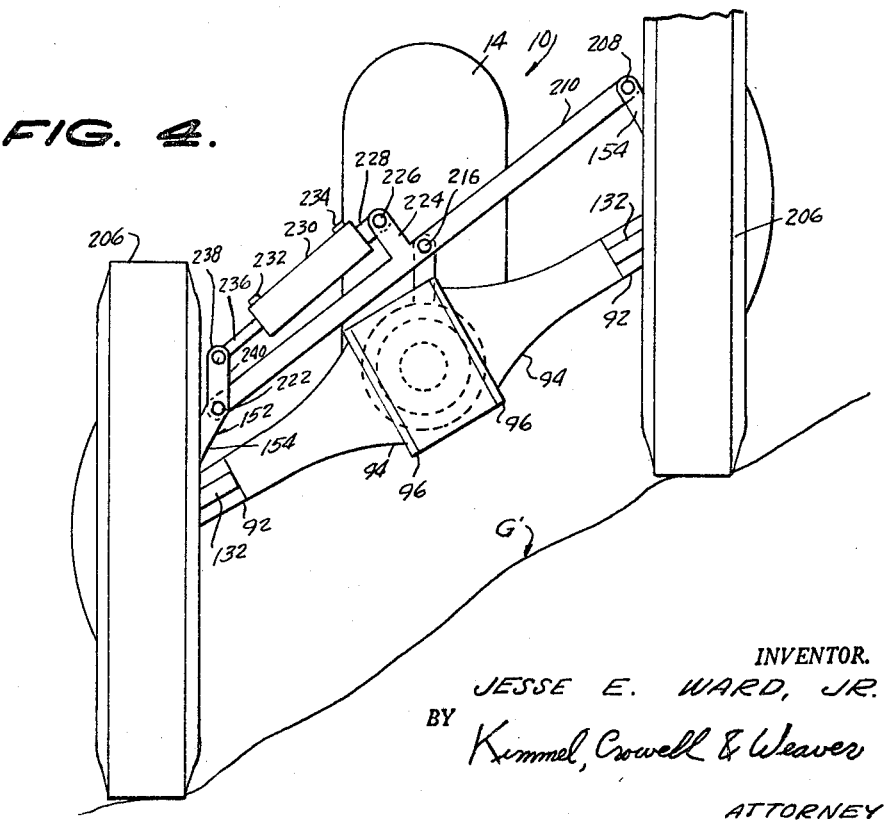
FIGURE 4 is an end elevational view, similar to FIGURE 3, FIGURE 4 showing the relative positions of the component elements of this invention when the tractor is traversing terrain inclined at an angle to a horizontal ground plane.

Now if it be assumed that the terrain changes from the horizontal ground line plane G of FIGURE 3 to an inclined plane of G' in FIGURE 4, that is, wherein the ground plane line slopes upwardly and to the right as viewed in this figure, the normal attitude of the tractor 10 will change and will tend to tilt to the left so that the above-mentioned vertical plane is now inclined at an angle other than 90° to the horizontal ground plane G. Now if this change of attitude takes place gradually, the vehicle 10 and its chassis 12, in so tilting, causes the mercury pool 423 to close the switch points 420, 424 when the angle of the tilt exceeds 3° but is less than a critical angle of, say 45°. With the closing of the switch points 420, 424, the electromagnet 326 is energized and this causes the armature 324 to move to the left as viewed in FIGURE 7, opening the conduit 318 in order that the hydraulic fluid, at its normal rate of flow, will be pumped by the pump P through the conduit 306 and the regulator valve means 309 to the port 308 entering the valve 310 for discharge through the conduit 318 and into the left hand side of the hydraulic cylinder 230 to force the piston 237, and consequently its piston rod 236 to move to the right.

As this retraction occurs, the bell crank levers 152 at the left side of the vehicle 10 are caused to pivot in a clockwise direction, and this movement is simultaneously transmitted to the bell crank levers 152 at the right hand side of the vehicle 10 via the tie bars 210, 212. The force exerted by the hydraulic cylinder 230 on the bell crank levers 152 is also transmitted to the chassis 12 of the tractor 10 whereby both the chassis 12, and the housing 44, 92 and 94, rotate relative to one another until the chassis 12 is again stabilized in its normal upright position described above and wherein a vertical plane bisecting the tractor 10 longitudinally is perpendicular to a horizontal ground line.

As the normal stable postion of the chassis 12 is regained, the mercury pool 423 moves to disengage the switch points 420, 424 thereby causing the electromagnet 326 to become deenergized whereupon the armature 324, under the influence of its conventional spring bias, returns to its neutral position of FIGURE 7 whereby the piston 237 and its associated piston rod 236 are held locked against further movement.

It has been found preferable to construct the levelling means in such a manner that the common axis of the pins 158 are contained in a vertical plane which includes the axis of the stem 118 and the center line of each associated wheel 108. It has also been found desirable to construct the mercury switch 422 so that the switches $S_1$, $S_2$ will close upon a change of substantially 3° in the angle of inclination of the chassis 12 in either direction whereby hunting is avoided in pitch changes of smaller magnitude.

It is obvious, of course, that if the tractor 10 and its chassis 12 travel terrain which causes the same to tilt towards the right, then of course the stabilizing effect is achieved by the movement of the mercury pool 443 which closes the switch points 438, 440 of the switch $S_2$, and this in turn leads to the energization of the electromagnet 328. With this electromagnet 328 being energized, the armature 330 shifts to the right as read in FIGURE 7 to open the conduit 320 to the normal flow of hydraulic fluid under pressure from the pump P through the regulator valve 309 whereby the same enters the hydraulic cylinder 230 at the other end thereof causing the piston 237 and its connected piston rod 238 to move to the left. This causes the bell crank levers to turn in the counter-clockwise direction and the chassis to reassume its normal upright position. When this attitude has been again achieved, the mercury pool 443 will shift away from the switch points 438, 440 and the circuit to the electromagnet 328 will become de-energized. The piston rod 236 and its piston 237 are, thus, locked in this new position, as before.

If the vehicle 10 should suddenly and unexpectedly tilt very fast in one direction so that its attitude tends to reach a critical angle of inclination which, in the absence of safety means could cause the tractor to overturn, safety means are provided and for the purpose of this explanation let it be assumed that the sudden tilt is to the left (left wheel 108 dropping into a deep hole). As before, the electromagnet 326 is energized through the circuitry described above causing the spool valve element 314 to open the conduit 318 whereby hydraulic fluid is admitted to the left side of the hydraulic cylinder 230, all as has been described above. This initiates the corrective measures tending to reestablish the stability of the vehicle 10, but note that while this circuit holds and as the angle of inclination reaches 10°, the switch $S_3$ will close. This instantly energizes the winding 309' of the regulator valve 309 opening the same to permit delivery of the maximum volume of hydraulic fluid to the valve 310 for discharge to the hydraulic cylinder 230 whereby the piston 237 and its connected piston rod 236 are more rapidly moved to the right to more swiftly effect the restabilization and the correct attitude of the vehicle 10, all in the manner described above. If the angle of tilt is to the right, then of course the switches $S_2$ and $S_4$ sequentially close in the manner of the switches $S_1$, $S_3$ to achieve the same results but in the reverse direction.

As the attitude of the chassis 12 is corrected the angle of the aforementioned plane passes back through the 10° (supra) towards 0°, the switch $S_3$ opens but the circuit of the $S_1$ continues to hold. With the opening of the switch $S_3$ the winding 309' of the regulator valve 309 is deenergized and the pump now delievers only its normal volume to the valve 310. The holding circuit of the switch $S_1$ continues to hold, maintaining the valve 310 in its open position until the angle of the aforementioned plane passes through an inclination of 3° towards 0°. As this condition is established, the switch $S_1$ opens to deenergize the winding 330 whereby the valve 310 returns to its normal neutral or closed position shown in FIGURE 7.

The above described operation constitutes a safety feature of this invention which becomes operative when the vehicle encounters hidden deep holes, the fast correction or stabilization of the vehicle preventing its overturning.

If in an emergency or under other operating conditions, the angle of the common coincident axes of the axles 90 swing through an arc of predetermined value, 45° for example, relative to the aforementioned plane, then a further safety means is provided which becomes operative until this abnormal condition is corrected or abated, the safety means being described immediately below.

Under the above described conditions, and assuming a condition of the vehicle 10 similar to that shown in FIGURE 4 of the drawings, either one or both of the switches $S_1$, $S_3$ will be closed and the pump P will be delivering hydraulic fluid under pressure to the hydraulic cylinder 230, all in the manner described above. However, when the predetermined degree of angularity has been reached and for which the switches 432 and 448 have been set occurs, the switch actuator 452 will engage the switch arm 434 to cause the coil or winding 330 to become deenergized to lock the components of the vehicle 10 in their then related positions. Further operation of the vehicle is halted until the abnormal condition is eliminated whereby the actuator 452 moves relative to the switch arm 434 to again close the circuit to the winding 330 of the electromagnet 326. It is understood, of course, that if the critical angle is achieved at the other side of the vehicle the switch arm actuator 454 will open the switch 448 by engaging the switch arm 450.

Should the vehicle operator wish to manually control the vehicle attitude, the switch arm 408 is disengaged from the fixed switch contact 412 and is moved into engagement with the switch contact 413. The switch arm 458 of the switch 460 is then moved into engagement with either of the fixed switch contacts 462, 464 thereby closing the circuit to a selected one of the electromagnets 326, 328. Upon becoming energized, the electromagnets 326 or 328 causes the armature 324 to shift to the left or right, respectively, and thereby move the valve spool elements 314, 316 in the manner described above whereby hydraulic fluid under pressure from the conduit 306 may pass into one or the other of the conduits 318, 320 without actuating the regulator means 309. This causes the piston 327 to move to the right or left and introduces the same movement to the piston rod 236 simultaneously whereby the desired attitude is achieved.

Having described and illustrated one embodiment of this invention in detail, it will be understood that the same is offered merely by way of example.

What is claimed is:

1. Levelling means for a land vehicle having a wheel supported chassis including a pair of wheels disposed, respectively, on opposite sides thereof in confronting relation relative to one another, said levelling means comprising motor means mounted on said chassis;
differential means;
a drive shaft connecting said motor means in driving relation with said differential means;
means mounting said differential means on said chassis for rotation relative to one another substantially about the longitudinal axis of said drive shaft;
an axle for each wheel of said pair of wheels;
means connecting said differential in driving relation with respect to said axis;
means mounting said pair of wheels on said axles;
first lever means for each wheel;
means connecting each of said first lever means intermediate their respective ends on the adjacent one of said axles for pivotal movement about a normally horizontal axis;
means connecting each wheel of said pair of wheels, respectively, on one end of its associated adjacent first lever means;
second lever means pivotally connected with the other ends of each of said first lever means;
power means comprising a hydraulic cylinder having one of its ends pivotally mounted on said chassis and its other end pivotally connected with at least one of said lever means for applying a turning force thereon to cause said axles and said differential to pivot simultaneously and in the same direction about the longitudinal axis of said drive shaft; and
control means for said power means including means responsive to the change of inclination of said chassis relative to a horizontal plane to effect actuation of said power means;

said control means for said power means comprises a hydro-electric system including a normally open mercury switch means mounted on said chassis, said mercury switch means closing in response to a change in the angle of inclination of said chassis relative to a horizontal plane to energize said system and actuate said power means; and wherein said hydro-electric system further includes:

fluid pump means;

a normally closed electro-magnetically operated valve means interposed between said pump means and said hydraulic cylinder, and an electro-magnetically operated hydraulic fluid regulator valve means having a first normally open position and a second open position, said hydraulic fluid regulator valve means being connected between said pump means and said valve means; and wherein said mercury switch means is compound including a pair of normally open mercury switches disposed, respectively, on opposite sides of said chassis, each one of each of said pair of mercury switches being preset to close and open in sequential order in response to the angle of inclination of said chassis;

one of each pair of said mercury switches being operatively connected with said electro-magnetic valve means and closing upon a first predetermined degree of chassis inclination to energize and open said electro-magnetic valve means and thereby effect actuation of said hydraulic cylinder, and the other of each of said pair of mercury switches closing at a greater angle of chassis inclination to actuate the fluid regulator valve means to admit a greater rate of flow of hydraulic fluid to said electro-magnetically operated valve means and consequently to said hydraulic cylinder to thereby effect a more rapid levelling of said chassis.

2. In the combination of claim 1 and wherein said hydro-electrical system further includes a series circuit connecting each of said one mercury switches of the pairs of mercury switches with said electro-magnetically operable valve means;

a normally closed mechanically actuated switch in each of said series circuits; and means actuating said last named switches to their respective open position as said chassis and said axles turn toward one another through a predetermined angle.

3. In the combination of claim 1 and an electric circuit including manually operable switch means to energize said electro-magnetic valve means.

4. A land vehicle comprising, in combination:

a chasis;

motor means mounted on said chassis and including a longitudinally extending drive shaft and a drive shaft casing therefor, said casing forming a fixed portion of said chassis;

an axle assembly including wheels at the ends thereof pivoted about longitudinally extending axes;

differential means in said axle assembly connected in driven relationship with said drive shaft and in driving relationship relative to said wheels, said differential means including a housing, said housing being provided with a substantially hollow boss receiving a portion of said drive shaft therethrough said boss having an outer end confronting, in close juxtaposition, the outer end of said drive shaft casing;

clamp means connecting and confronting outer juxtaposed ends of said boss and said drive shaft casing to prevent relative movement thereof axially with respect to said axis of said drive shaft while permitting relative rotation of said chassis and said differential housing about said axis of said drive shaft;

torque applying means connected on and extending between said chassis and wheels, said torque applying means being operable to apply a turning force on said chassis to effect a pivotal movement thereof about said drive shaft axis, and consequently of said wheels, about said longitudinal axes; and means responsive to the attitude of said vehicle for energizing said torque applying means;

said clamping means comprising;

an outwardly extending flange formed on said outer end of said drive shaft casing;

a collar slidably mounted on said flange, said collar including an end wall at one end thereof abutting the inner end of said flange, and said collar at its other end abutting the outer end of said boss; and means fixedly securing said collar and said boss together.

5. In the combination of claim 4 wherein said torque applying means comprises hydraulic means.

6. In the combination of claim 4 wherein said torque applying means comprises hydraulic means; and said attitude responsive means comprise electrical control means.

References Cited

UNITED STATES PATENTS

| 1,255,599 | 2/1918 | Gross | 180—41 |
| 3,160,221 | 12/1964 | Boone | 180—41 |
| 3,189,117 | 6/1965 | Ammon | 280—111 X |
| 3,233,909 | 2/1966 | Boone | 180—41 X |
| 3,309,097 | 3/1967 | Seeber | 180—41 X |

FOREIGN PATENTS 574,517  3/1958  Italy.

A. HARRY LEVY, Primary Examiner

U.S. Cl. X.R.

180—75; 280—6.11, 111